(12) United States Patent
Kim et al.

(10) Patent No.: US 12,057,546 B2
(45) Date of Patent: Aug. 6, 2024

(54) ELECTRODE ASSEMBLY

(71) Applicant: LG Energy Solution, Ltd., Seoul (KR)

(72) Inventors: Yong Jun Kim, Daejeon (KR); Hee Seok Jeong, Daejeon (KR); Ki Won Sung, Daejeon (KR); Eun Ju Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/073,233

(22) Filed: Dec. 1, 2022

(65) Prior Publication Data

US 2023/0097872 A1  Mar. 30, 2023

(51) Int. Cl.
*H01M 50/538* (2021.01)
*H01M 10/04* (2006.01)
*H01M 50/105* (2021.01)

(52) U.S. Cl.
CPC ... *H01M 10/0459* (2013.01); *H01M 10/0468* (2013.01); *H01M 50/105* (2021.01); *H01M 50/538* (2021.01)

(58) Field of Classification Search
CPC ......... H01M 10/0459; H01M 10/0468; H01M 50/538; H01M 50/105
See application file for complete search history.

(56) References Cited

U.S. PATENT DOCUMENTS

| | | |
|---|---|---|
| 2010/0021810 A1 | 1/2010 | Zhu et al. |
| 2010/0279161 A1 | 11/2010 | Kang et al. |
| 2011/0052964 A1 | 3/2011 | Kim et al. |
| 2015/0140398 A1 | 5/2015 | Yamazaki |
| 2015/0288022 A1 | 10/2015 | Lee |
| 2016/0104872 A1 | 4/2016 | Shiraishi |
| 2016/0276712 A1 | 9/2016 | Sale et al. |

(Continued)

FOREIGN PATENT DOCUMENTS

| | | |
|---|---|---|
| CN | 101897058 A | 11/2010 |
| CN | 105359322 A | 2/2016 |
| CN | 105917511 A | 8/2016 |

(Continued)

OTHER PUBLICATIONS

Search Report dated Mar. 13, 2023 from the Office Action for Chinese Application No. 201980005167.8 issued Mar. 21, 2023, pp. 1-3. [See p. 1, categorizing the cited references].

(Continued)

*Primary Examiner* — Jane J Rhee
(74) *Attorney, Agent, or Firm* — Lerner David LLP

(57) ABSTRACT

The present invention provides an electrode assembly in which a negative electrode coated with a negative electrode active material on a surface of a negative electrode collector, a separator, and a positive electrode coated with a positive electrode active material on a surface of a positive electrode collector are repeatedly laminated, the electrode assembly comprising: monocells in which the positive electrode, the separator, the negative electrode, and the separator are laminated, wherein at least two or more monocells are laminated, wherein, in any one of the monocells, an expansion part extending lengthily to one side is formed on the separators, and the expansion part of the separator surrounds the monocells laminated to be disposed at the outermost layers to fix the laminated monocells.

10 Claims, 17 Drawing Sheets

(56) References Cited

U.S. PATENT DOCUMENTS

2017/0162910 A1* 6/2017 Katou ............... H01M 10/052
2018/0145376 A1 5/2018 Jo et al.

FOREIGN PATENT DOCUMENTS

| | | |
|---|---|---|
| EP | 3069407 A1 | 9/2016 |
| JP | 2000149982 A | 5/2000 |
| JP | 2005310578 A | 11/2005 |
| JP | 2010123988 A | 6/2010 |
| JP | 2011216408 A | 10/2011 |
| KR | 20090064021 A | 6/2009 |
| KR | 20100088704 A | 8/2010 |
| KR | 20130103202 A | 9/2013 |
| KR | 20140063208 A | 5/2014 |
| KR | 20150029228 A | 3/2015 |
| KR | 20150038945 A | 4/2015 |
| KR | 20150100017 A | 9/2015 |
| KR | 20170103485 A | 9/2017 |
| KR | 20180058370 A | 6/2018 |
| WO | 2015068143 A1 | 5/2015 |

OTHER PUBLICATIONS

International Search Report from Application No. PCT/KR2019/009040 mailed Oct. 30, 2019, 2 pages.
Extended European Search Report including Written Opinion for Application No. EP19862026 dated Feb. 22, 2021, 6 pgs.

\* cited by examiner

ELECTRODE ASSEMBLY

CROSS-REFERENCE TO RELATED APPLICATIONS

The present application is a divisional of U.S. patent application Ser. No. 16/759,895, filed on Apr. 28, 2020, which is a national phase entry under 35 U.S.C. § 371 of International Patent Application No. PCT/KR2019/009040, filed on Jul. 22, 2019, published in Korean, which claims priority from Korean Patent Application No. 10-2018-0112395, filed on Sep. 19, 2018, the disclosures of which are hereby incorporated by reference in their entireties.

TECHNICAL FIELD

The present invention relates to an electrode assembly embedded in a secondary battery, and more particularly, to an electrode assembly that is fixed by an expansion part extending from a separator or an extension part extending from a collector to solve a problem occurring an electrode assembly fixed by using a tape after manufactured in a lamination & stacking manner according to a related art.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Such a secondary battery is configured so that an electrode assembly is embedded in a battery case (for example, a pouch, a can, and the like). The electrode assembly mounted in the battery case is repeatedly chargeable and dischargeable because of a structure in which a positive electrode/a separator/a negative electrode are stacked.

FIG. 1a is a side view illustrating a process of manufacturing an electrode assembly through a lamination & stacking process among electrode assemblies according to a related art, FIG. 1b is a side view illustrating a state in which a plurality of monocells 4, in which a positive electrode 1, a separator 3, a negative electrode 2, and a separator 3 are sequentially laminated, are laminated and then fixed by a tape 5, and FIG. 1c is a plan view illustrating a state in which the electrode assembly, in which the plurality of monocells are laminated, is fixed by the tape 5.

Referring to FIGS. 1a to 1c, in the lamination & stacking manner, the positive electrode 1, the separator 3, the negative electrode 2, and the separator 3 are continuously unwound to be supplied in a state of being wound in the form of a roll. Here, each of the positive electrode 1 and the negative electrode 2 is cut and moved by a predetermined size from the separator 3 to pass through a laminating device. As illustrated in FIG. 1b, in the positive electrode 1 and the negative electrode 2, a positive electrode active material and a negative electrode active material are applied to both surfaces of a positive electrode collector (a portion expressed as a diagonal line at a center) and a negative electrode collector (a portion expressed in an X shape at the center), respectively.

While passing through the laminating device, heat and a pressure may be applied between the positive electrode 1, the separator 3, and the negative electrode 2 to bond the positive electrode 1, the separator 3, and the negative electrode 2 to each other. In the bonded state, the positive electrode 1 and the positive electrode 1, which are adjacent to each other (the negative electrode 2 and the negative electrode 2, which are adjacent to each other), are cut therebetween to continuously manufacture one monocell 4 in which the positive electrode 1, the separator 3, the negative electrode, and the separator 3 are sequentially laminated downward.

The monocells 4 are laminated by a predetermined number and manufactured as an electrode assembly. When the lamination is completed, the monocells 4 are fixed, and ends of the tape 5 adhere to the uppermost monocell and the lowermost monocell, respectively.

However, in the manner of fixing the monocells 4 by using the tape 5 as described above, the ends of the tape 5 additionally protrude from the uppermost layer and the lowermost layer to cause a thickness difference. Also, when the tape 5 is attached, there is a problem that a portion of an edge of the negative electrode 2 (that is cut relatively larger than the positive electrode to realize stability) is folded.

As described above, internal resistance may increase due to the thickness difference and the folding of the negative electrode to accelerate degradation of the electrodes.

DISCLOSURE OF THE INVENTION

Technical Problem

Therefore, a main object of the present invention is to provide an electrode assembly in which laminated monocells are stably fixed to prevent folding of a negative electrode and an increase in resistance of the negative electrode.

Technical Solution

The present invention for achieving the above object provides an electrode assembly in which a negative electrode coated with a negative electrode active material on a surface of a negative electrode collector, a separator, and a positive electrode coated with a positive electrode active material on a surface of a positive electrode collector are repeatedly laminated, the electrode assembly comprising: monocells in which the positive electrode, the separator, the negative electrode, and the separator are sequentially laminated, wherein at least two or more monocells are laminated, wherein, in any one of the monocells, an expansion part extending lengthily to one side is formed on one of the separators, and the expansion part of the separator surrounds the monocells laminated to be disposed at the outermost layers to fix the laminated monocells.

In an embodiment of the present invention, the monocell comprising the expansion part may be a monocell laminated at the uppermost or lowermost layer, and the separator comprising the expansion part may be a separator disposed between the positive electrode and the negative electrode in the corresponding monocell.

Each of the monocells may have a rectangular shape, a positive electrode tab extending from the positive electrode and a negative electrode tab extending from the negative electrode may protrude in opposite directions, and the expansion part of the separator may extend in a direction perpendicular to the protruding direction of the positive electrode tab or the negative electrode tab.

In the monocell, the positive electrode and the separator may be bonded to each other, and the separator and the negative electrode may be bonded to each other.

In another embodiment, the monocell comprising the separator, on which the expansion part is formed, may be a monocell laminated at the uppermost layer, and the positive electrode may be laminated on the separator on which the expansion part is formed, wherein, when the expansion part surrounds the entire electrode assembly so that an end of the expansion part covers the positive electrode disposed on the separator on which the expansion part is formed, the negative electrode may be additionally laminated on the expansion part.

In another embodiment, the monocell comprising the separator, on which the expansion part is formed, may be a monocell laminated at the uppermost layer, and the positive electrode may be laminated on the separator on which the expansion part is formed, wherein the separator may be additionally laminated on the positive electrode laminated on the separator on which the expansion part is formed, and the negative electrode may be additionally laminated on the separator. That is, this structure is the same as that according to the forgoing embodiments in that the negative electrode is disposed at the uppermost layer but is different from that according to the foregoing embodiments in that the separator is additionally laminated.

In another embodiment, the monocell comprising the separator, on which the expansion part is formed, may be a monocell laminated at the uppermost layer, and the positive electrode may be laminated on the separator on which the expansion part is formed, wherein the positive electrode laminated on the separator on which the expansion part is formed may be a single-sided positive electrode in which the positive electrode active material is applied to only one surface of the positive electrode collector, and a surface on which the positive electrode active material is not applied may be disposed to face an upper side.

Furthermore, the present invention may additionally provide an embodiment that is capable of being easily applied to the electrode assembly according to the related art. In an embodiment, monocells in which the positive electrode, the separator, the negative electrode, and the separator are sequentially laminated may be provided, wherein at least two or more monocells may be laminated, and the separator and the negative electrode may be sequentially additionally laminated on the monocell laminated at the uppermost layer. Here, the separator additionally laminated together with the negative electrode may comprise an expansion part extending lengthily to one side, and the expansion part may surround the laminated monocells and the additionally laminated negative electrode to fix the monocells and the negative electrode.

As described above, the expansion part may surround the laminated monocells, and an end of the expansion part may be bonded and fixed to a predetermined point by applying heat and a pressure. Also, the expansion part may have a thickness different from that of the other portion of the separator contacting the positive electrode or the negative electrode. Alternatively, the expansion part may have a composition different from that of the other portion of the separator contacting the positive electrode or the negative electrode.

Furthermore, the expansion part of the separator may surround the monocells in a state in which a flat plate is inserted into one side or both sides of the positive electrode and the negative electrode so that the flat plate is erected in a direction perpendicular to a direction in which the positive electrode and the negative electrode are laminated.

Here, the flat plate may be made of a non-conductive material, and when sealing is performed after the electrode assembly is inserted int a pouch, it may prevent the separator from being rolled up or pressed into a portion at which the pouch is narrowed.

Alternatively, the expansion part of the separator may surround the monocells by two turns, and the flat plate may be disposed to be inserted between the layer surrounded firstly by the expansion part and the layer surrounded secondarily by the expansion part and is made of a metal material having thermal conductivity. Here, the flat plate may serve as a cooling plate that absorbs heat generated in the electrodes to reduce a temperature.

Furthermore, the present invention additionally provides an electrode assembly in which an extension parts (that are separated from a positive electrode tab and a negative electrode tab) may be formed on collectors of a negative electrode and/or a positive electrode constituting a unit cell instead of the expansion part of the separator, and the extension parts may be bonded to each other to fix the unit cell.

That is, an electrode assembly in which a negative electrode coated with a negative electrode active material on a surface of a negative electrode collector, a separator, and a positive electrode coated with a positive electrode active material on a surface of a positive electrode collector are repeatedly laminated according to this embodiment, the electrode assembly comprising: monocells in which the positive electrode, the separator, the negative electrode, and the separator are sequentially laminated, wherein at least two or more monocells are laminated, wherein each of the two or more monocells of the monocells comprises a positive electrode extension part, in which a positive electrode collector extends lengthily to one side, and a negative electrode extension part, in which a negative electrode collector extends lengthily to the other side, and the positive electrode extension part and the negative electrode extension part are respectively bonded to a positive electrode extension part and a negative electrode extension part to fix the laminated monocells.

Here, the positive electrode extension part and the negative electrode extension part may be formed separately from a positive electrode tab extending from the positive electrode and a negative electrode tab extending from the negative electrode, respectively.

Each of the monocells may have a rectangular shape, the positive electrode tab and the negative electrode tab may protrude in opposite directions, and a portion at which the positive electrode extension parts are bonded to each other and a portion at which the negative electrode extension parts are bonded to each other may protrude in opposite directions, i.e., protrude in a direction perpendicular to the positive electrode tab and the negative electrode tab.

In another embodiment, the monocells comprising the positive electrode extension part and the negative electrode part may be all laminated monocells, and in all the laminated monocells, the positive electrode extension parts may be bonded to each other, and the negative electrode extension parts may be bonded to each other.

In another embodiment, the positive electrode may be disposed at the uppermost layer of the monocell laminated at the uppermost layer, and the separator and the negative electrode may be sequentially additionally laminated on the positive electrode disposed at the uppermost layer.

In another embodiment, the monocells comprising the positive electrode extension part and the negative electrode part may be a monocell laminated at the uppermost layer and a monocell laminated at the lowermost layer, and a sub electrode assembly in which a plurality of monocells are laminated may be inserted between the monocell laminated at the uppermost layer and the monocell laminated at the lowermost layer, wherein, in any one of the monocells constituting the sub electrode assembly, an expansion part extending lengthily to one side may be formed on one of the separators, and the expansion part of the separator may surround all the monocells of the sub electrode assembly so as to be disposed at the outermost layer in the sub electrode assembly.

As described above, in the positive electrode collector, the positive electrode extension part may have a thickness different from that of a portion coated with the positive electrode active material, and, in the negative electrode collector, the negative electrode extension part may have a thickness different from that of a portion coated with the negative electrode active material.

In another embodiment, each of the monocells may have a rectangular shape, a positive electrode tab extending from the positive electrode collector may be integrated with the positive electrode extension part, and a negative electrode tab extending from the negative electrode collector may be integrated with the negative electrode extension part, wherein the positive electrode extension part may have a shape protruding from two sides of the monocell, and the negative extension part may have a shape protruding from two sides that are opposite to the protruding two side of the positive electrode extension part.

Here, pattern grooves that are recessed in directions in which the positive electrode and the negative electrode are laminated may be formed in a portion at which the positive electrode extension parts are bonded to each other and a portion at which the negative electrode extension parts are bonded to each other, respectively.

Here, the pattern groove formed in the portion at which the positive electrode extension parts are bonded to each other may be disposed at a position symmetrical to the pattern groove formed in the portion at which the negative electrode extension parts are bonded to each other.

Furthermore, in the monocell, the positive electrode and the separator may be bonded to each other, and the separator and the negative electrode may be bonded to each other.

Advantageous Effects

The present invention having the configuration as described above, since the expansion of the separator surrounds the laminated monocells, the laminated monocells may be fixed. Thus, the tape according to the related art may be eliminated to solve the problems of the internal resistance increase and the electrode degradation due to the difference in thickness and folding of the negative electrode.

The expansion part may be bonded at a predetermined point by applying the heat and pressure to form the smooth surface.

The expansion part of the separator may have the thickness and/or composition different from those of other portions to improve bonding force and the impregnation of the electrolyte.

The monocell has high stability because the positive electrode and the separator are bonded to each other, and the separator and the negative electrode are bonded to each other.

Also, the flat plate may be selectively inserted in the region surrounded by the extension part to prevent the separator from being damaged when the pouch is sealed.

When the flat plate is made of the metal material, the cooling efficiency may be provided by increasing the heat dissipation area.

Furthermore, instead of the separator, in the electrode assembly in which the positive electrode collector and the negative electrode collector may extend to be fixed, the tape according to the related art may be omitted to solve the problems of the internal resistance increase and the electrode degradation due to the difference in thickness and folding of the negative electrode.

MODE FOR CARRYING OUT THE INVENTION

Figure 1A:
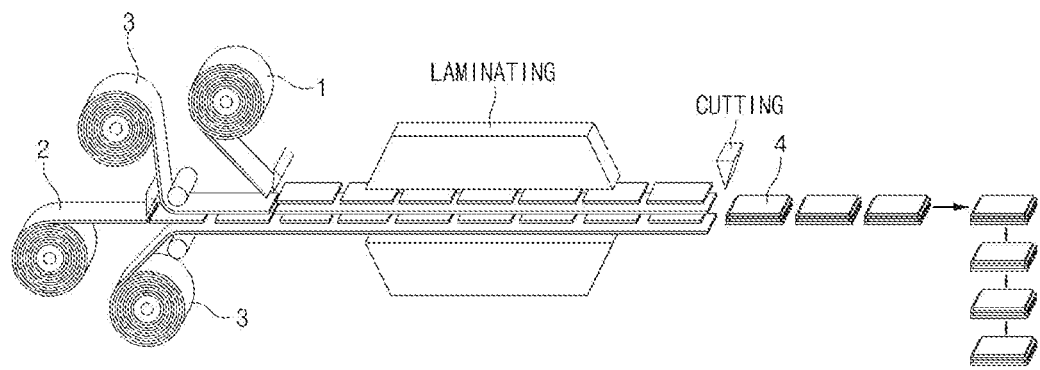
FIG. 1a is a side view illustrating a process of manufacturing an electrode assembly through a lamination & stacking process among electrode assemblies according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly in which a negative electrode 20 in which a negative electrode active material 22 is applied on a surface of a negative electrode collector 21, a separator 30, and a positive electrode 10 in which a positive electrode active material 12 is applied on a surface of a positive electrode collector 11 are respectively laminated. Here, the laminated structure is fixed by the separator comprising an expansion part provided in one of the laminated monocells or by bonding the monocells comprising the extension parts to the collector so that a tape for fixing according to the related art is omitted. Hereinafter, embodiments according to the present invention will be described with reference to the accompanying drawings.

[Fixing Through Separator]

The present invention provides an electrode assembly that is capable of being fixed by a separator 30 comprising an extension part 31.

Figure 2:
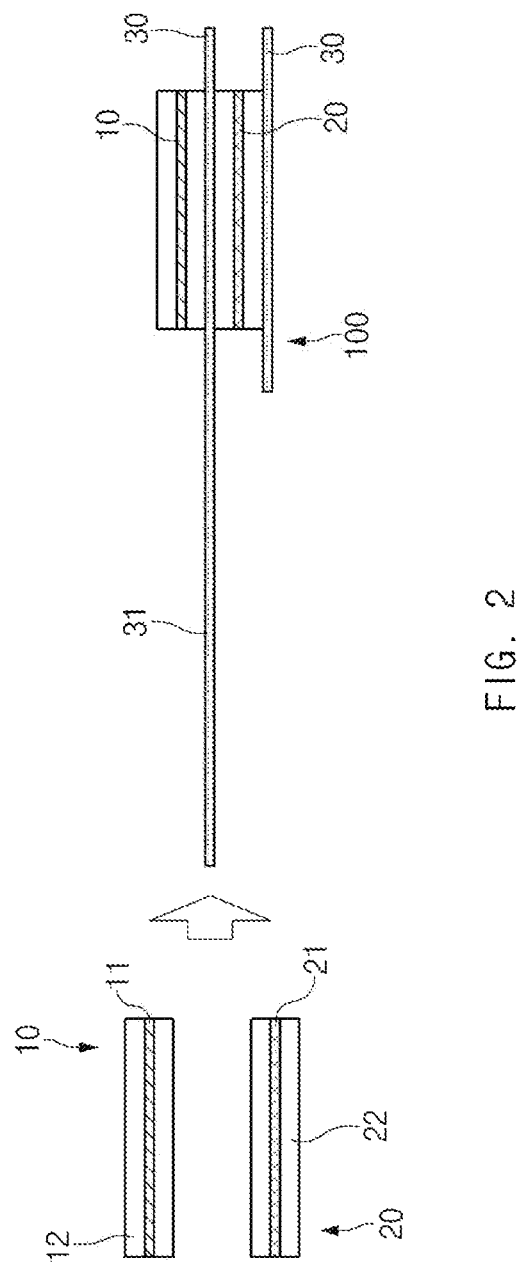
FIG. 2 is a side view illustrating a state in which a positive electrode and a negative electrode are respectively laminated on upper and lower sides of a separator, on which an expansion part is formed, to constitute a monocell.

FIG. 2 is a side view illustrating a state in which a positive electrode 10 and a negative electrode 20 are respectively laminated on upper and lower sides of the separator 30, on which an expansion part 31 is formed, to constitute a monocell on which the lowermost separator 30 (having a general size like the related art) is laminated. The electrode assembly fixed by the separator 30 is provided with one or more separators 30 comprising the expansion part 31.

Embodiment 1

Figure 3A:
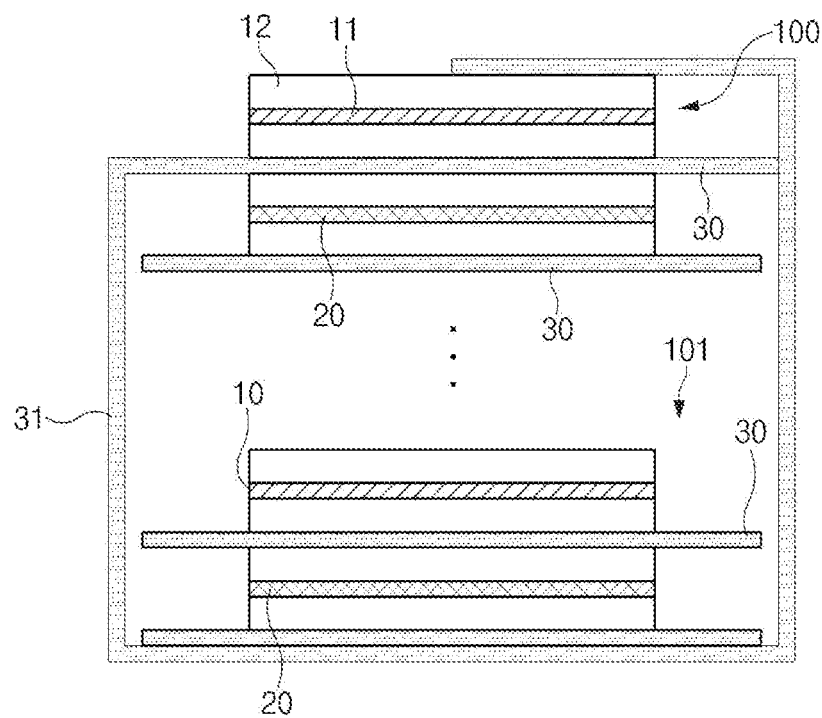
FIG. 3a is a side view illustrating a state in which a plurality of monocells are laminated according to Embodiment 1, wherein the monocell of FIG. 2 is laminated at the uppermost layer, and a separator expansion part of the uppermost monocell surrounds the entire monocells.
Figure 3B:
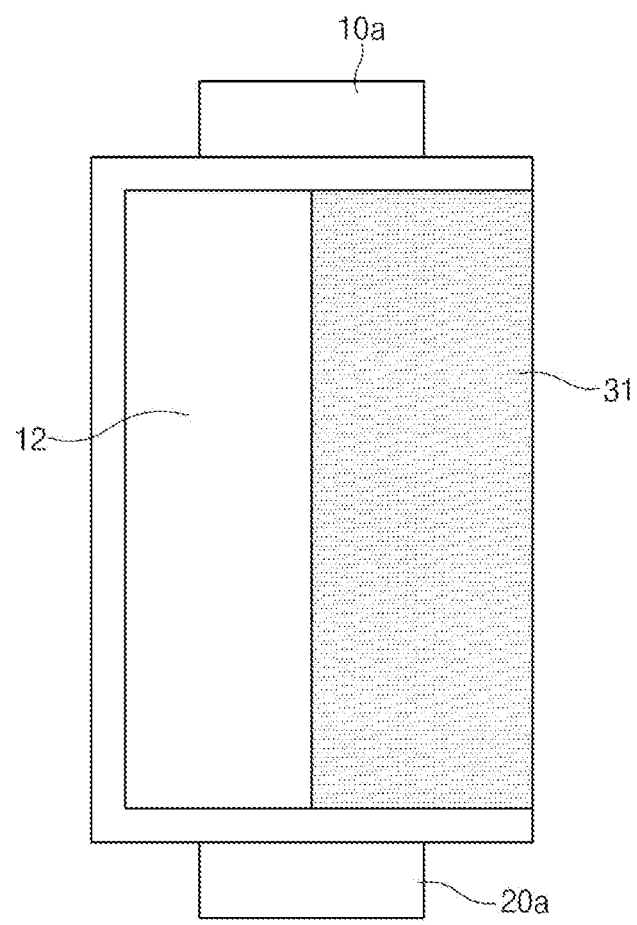
FIG. 3b is a plan view when the state of FIG. 3 is viewed downward from an upper side.

FIG. 3a is a side view illustrating a state in which a plurality of monocells 100 and 101 are laminated according to Embodiment 1, wherein the monocell 100 of FIG. 2 is laminated at the uppermost layer, and a separator expansion part 31 of the uppermost monocell 100 surrounds the entire monocells 100 and 101, and FIG. 3b is a plan view when the state of FIG. 3 is viewed downward from an upper side. As illustrated in FIGS. 3a and 3b, an electrode assembly according to Embodiment 1 of the present invention is manufactured by laminating the plurality of monocells 100 and 101. In the monocells 101 remaining except for the uppermost monocell 100, a positive electrode 10, a separator 30, a negative electrode 20, and a separator 30 are sequentially laminated downward from an upper side, and heat and/or a pressure may be applied to each of contact surfaces to be bonded to each other. However, the monocell 100 laminated at the uppermost layer is the same as the monocell 101 in that the positive electrode 10, the separator 30, the negative electrode 20, and the separator 30 are sequentially laminated. However, as illustrated in FIG. 2, the monocell 100 has a structure in which the expansion part 31 having a length that extends to one side of the separator 30 is formed.

When all the predetermined number of monocells 100 and 101 are laminated, the expansion part 31 may have a length that is sufficient to surround the monocells 101 and the uppermost monocell 100. In this embodiment, although the monocell 100 comprising the expansion part 31 is laminated at the uppermost layer when the monocell 100 is laminated to manufacture the electrode assembly, the monocell 100 may be laminated at an intermediate layer as well as the lowermost layer.

After the corresponding monocell (the monocell comprising the expansion part) is laminated at the uppermost layer, as illustrated in FIG. 3, the expansion part 31 surrounds all the monocells 100 and 101 laminated to be disposed on the outermost layers (so that the expansion part passes below the lowermost monocell to allow an end of the expansion part to be disposed on the uppermost monocell). Also, as illustrated in FIGS. 3a and 3b, the end is boned to a top surface of the uppermost monocell 100 (i.e., a top surface of the positive electrode in the drawings) by applying the heat and pressure.

Here, a position of the end of the expansion part 31 may be adjusted according to a thickness of the expansion part 31 so that a height difference on the uppermost surface may be minimized or removed. For example, if the thickness of the extension part 31 is very thin, as illustrated in FIG. 3a, the end of the expansion part 31 may be preferably configured to cover only about half of the positive electrode disposed at the uppermost layer, and if the height difference according to the thickness of the expansion part 31 occurs at a significant degree, the end of the expansion part 31 may be preferably configured to cover the entire positive electrode 10 disposed at the uppermost layer or a coating portion of a positive electrode active material 12 (here, if the monocell is disposed at the lowermost layer, the end of the expansion part 31 is preferably configured to cover the entire negative electrode 20 disposed at the uppermost layer or a coating portion of a negative electrode active material 22).

The separator 30 is required to have an appropriate thickness so as to separate the negative electrode 20 and the positive electrode 10. However, since the extension part 31 that deviate between the positive electrode 10 and the negative electrode 20 does not need to have the required thickness of the separator 30, the expansion part 31 may have a thickness different from that of a portion of the separator 30 comprising the expansion part 31, which contacts the positive electrode 10 or the negative electrode 20.

Alternatively, a portion of the separator 30 comprising the expansion part 31, which contacts the positive electrode 10 or the negative electrode 20, and the expansion part 31 may be manufactured with different compositions. For example, the expansion part 30 may have the same thickness as the portion contacting the positive electrode 10 and the negative electrode 20, but may be different in that an additive is added during the manufacture so as to be more durable and easily heat-bonded.

As illustrated in FIG. 3b, the uppermost monocell 100 has a rectangular or square shape when viewed from an upper side. Here, a positive electrode tab 10a extending from the positive electrode 10 and a negative electrode tab 20a extending from the negative electrode 20 protrude in directions opposite to each other, and the expansion part 31 of the separator 30 extends in a direction perpendicular to the protruding direction of the positive electrode tab 10a or the negative electrode tab 20a (see FIGS. 3a and 3b).

Embodiment 2

In an electrode assembly, it is preferable that a double-sided positive electrode is not disposed at the outermost layer to minimize precipitation of lithium (Li) contained in a positive electrode active material. In more detail, a single-sided positive electrode or a negative electrode may be disposed at the outermost layer to prevent a positive electrode active material from being exposed from the outermost layer. Thus, in the present invention, a configuration in which the single-sided positive electrode is disposed at the outermost layer is provided as Embodiment 2, and a configuration in which the negative electrode 20 is disposed at the outermost layer is provided as Embodiment 3.

That is, like the electrode assembly according to Embodiment 1, in the electrode assembly according to Embodiment 2, the monocell 100 comprising the separator 20 on which the expansion part 31 is formed is laminated at the uppermost layer, and the positive electrode 10 is laminated on the separator 30 on which the expansion part 31 is formed. Here, the positive electrode 10 that is the uppermost layer laminated on the separator 30 on which the expansion part 31 is formed is a single-sided positive electrode on which the positive electrode active material 12 is applied to only one surface of the positive electrode collector 11. Here, the positive electrode 10 that is the uppermost layer is disposed so that a surface on which the positive electrode active material 12 is not applied faces an upper side. That is, the electrode assembly according to Embodiment 2 has the same configuration as the electrode assembly of FIG. 3a, i.e., has a structure in which the positive electrode active material 12 on the positive electrode collector 11 is removed from the positive electrode laminated at the uppermost end.

Embodiment 3

In an electrode assembly according to Embodiment 3 of the present invention, a negative electrode 20 is additionally laminated in the electrode assembly according to Embodiment 1 so that the negative electrode 20 is disposed at the uppermost layer.

Figure 3C:
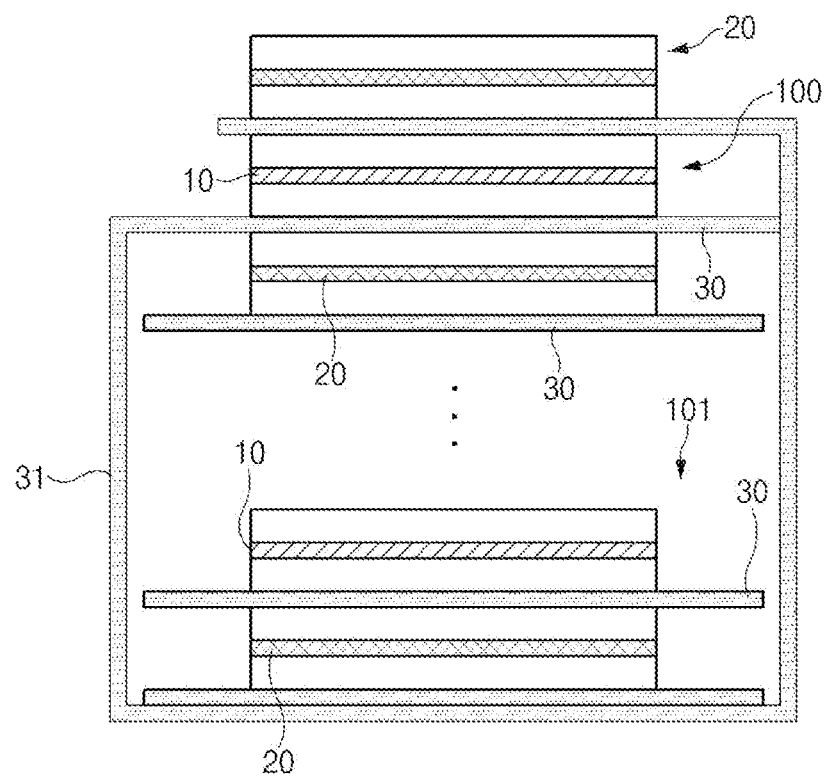
FIG. 3c is a side view illustrating a state in which a plurality of monocells are laminated according to Embodiment 3 of the present invention, wherein the monocell of FIG. 2 is laminated at the uppermost layer, and a separator expansion part of the uppermost monocell surrounds the entire monocells, and then, the negative electrode is additionally laminated on the separator expansion part.

That is, FIG. 3c is a side view illustrating a state in which a plurality of monocells 100 and 101 are laminated according to Embodiment 3 of the present invention, wherein the monocell 100 of FIG. 2 is laminated at the uppermost layer, and a separator expansion part 31 of the uppermost monocell 100 surrounds the entire monocells 100 and 101, and then, the negative electrode 20 is additionally laminated on the separator expansion part. As illustrated in the drawing, the electrode assembly according to Embodiment 3 has a structure in which an end of the expansion part 31 of the separator 30 surrounds and covers the entire uppermost positive electrode 10 in the structure according to the Embodiment 1. Alternatively, in third embodiment, if the end of the expansion part 31 of the separator does not cover the entire uppermost positive electrode 10, the separator 30 may be additionally laminated on the uppermost positive electrode 10, and then, the negative electrode 20 may be laminated on the separator 30.

Embodiment 4

Figure 3D:
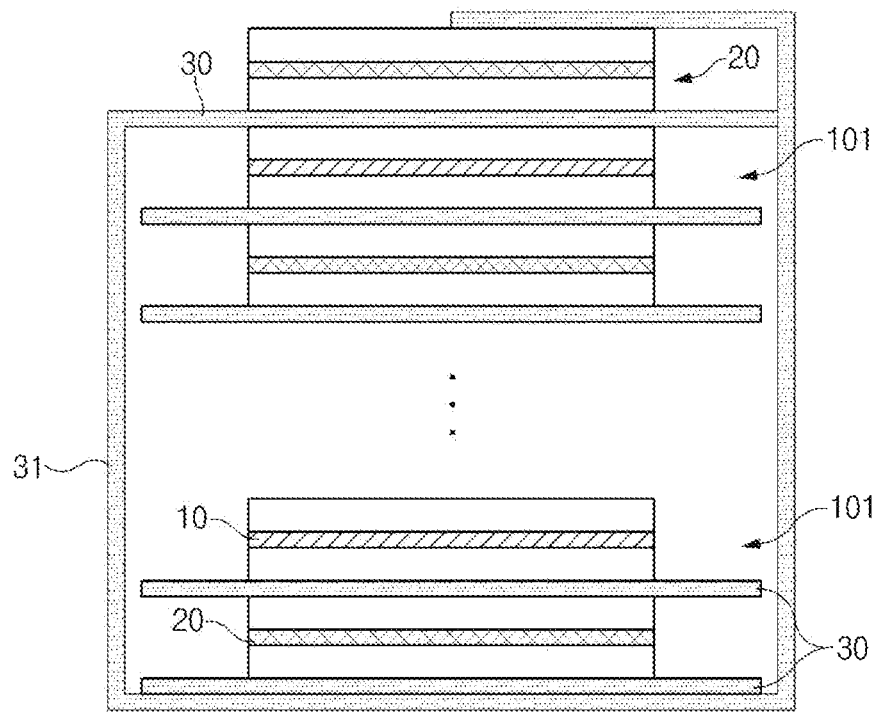
FIG. 3d is a side view illustrating a state in which the negative electrode is laminated on the separator comprising the expansion part, and then, the expansion part of the separator surrounds the entire monocells as a structure in which a plurality of monocells 101, which do not comprise the expansion part, are laminated, the separator comprising the expansion part is laminated on the monocells 101, and the separator comprising the expansion part and the negative electrode are additionally laminated as auxiliary units according to Embodiment 4 of the present invention.

Furthermore, the present invention provides a structure, which is capable of being more easily applied to the (lamination & stacking type) electrode assembly according to the related art, as Embodiment 4. FIG. 3d is a side view illustrating a state in which a plurality of monocells 101, which do not comprise an expansion part, are laminated, only a separator 30 comprising the expansion part is laminated on the monocells 101 (instead of the monocell laminated at the uppermost end in Embodiments 1, 2, and 3), a negative electrode 20 is additionally laminated on the separator 30 comprising the expansion part 31, and the expansion part 31 of the separator 30 surrounds the entire monocells 101.

Figure 1B:
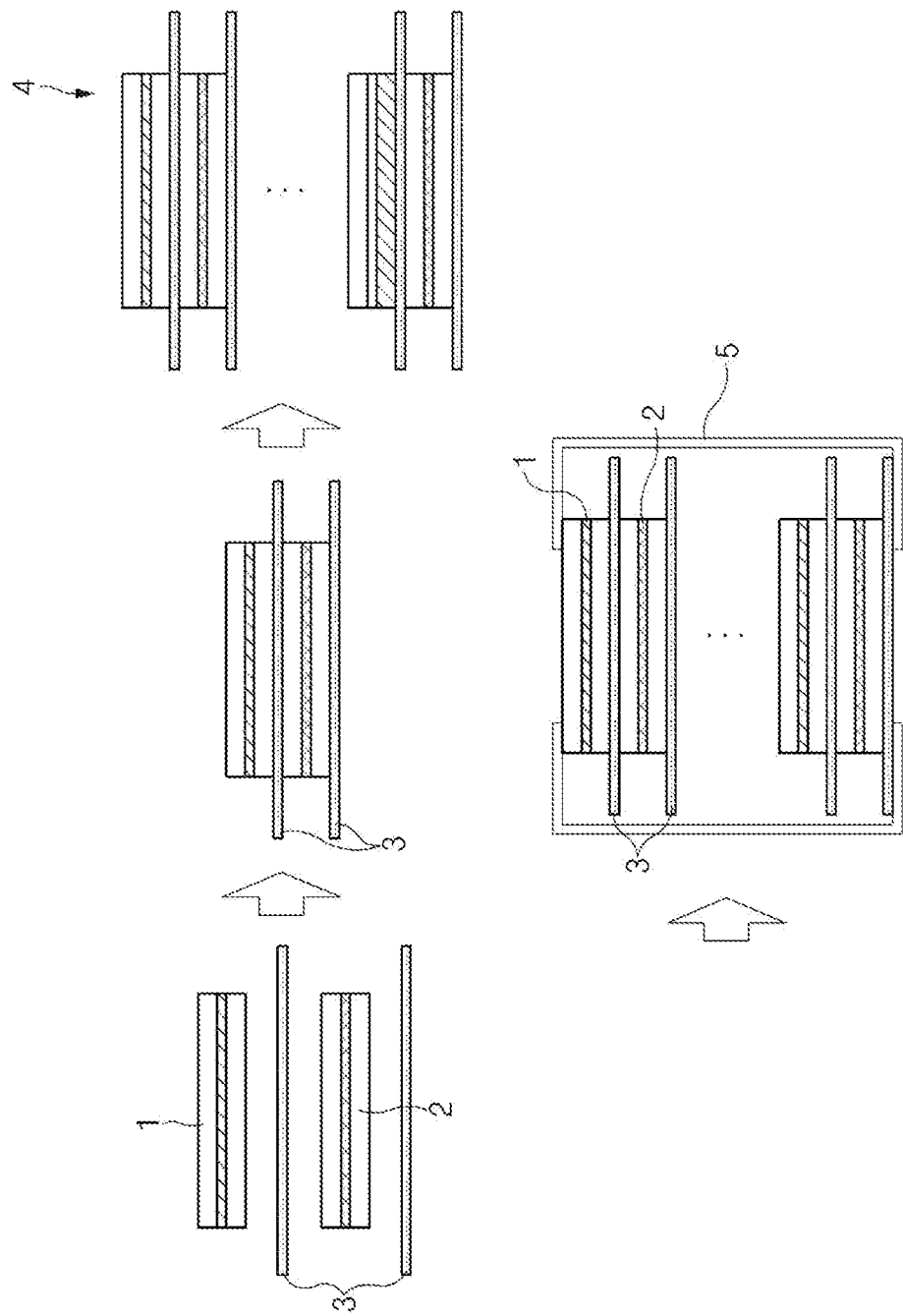
FIG. 1b is a side view illustrating a state in which a plurality of monocells 4, in which a positive electrode 1, a separator 3, a negative electrode 2, and a separator 3 are sequentially laminated, are laminated and then fixed by a tape 5.
Figure 1C:
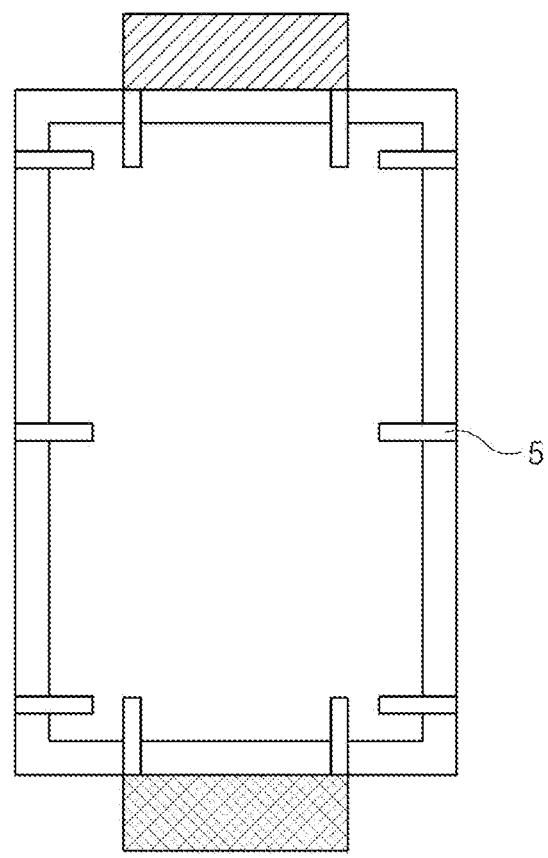
FIG. 1c is a plan view illustrating a state in which the electrode assembly, in which the plurality of monocells are laminated, is fixed by the tape 5.

That is, in this embodiment, the separator 30 comprising the expansion part 31 is additionally laminated at the uppermost layer instead of the tape 5 being removed in the electrode assembly of FIG. 1b, the separator 30 is additionally laminated at the uppermost layer, the negative electrode 20 is laminated on the separator 30, and the expansion part 31 surrounds the entire monocells 101 and the additionally laminated uppermost negative electrode 20 to fix the electrode assembly.

Embodiment 5

Furthermore, the present invention additionally provides a structure in which a flat plate 40 is embedded so that a structure of the electrode assembly is more strong, and the electrode assembly is embedded in a pouch 50 to prevent a separator 30 from being jammed into a space, which becomes narrow when the pouch 50 is sealed, or damaged, as Embodiments 5 and 6.

Figure 4A:
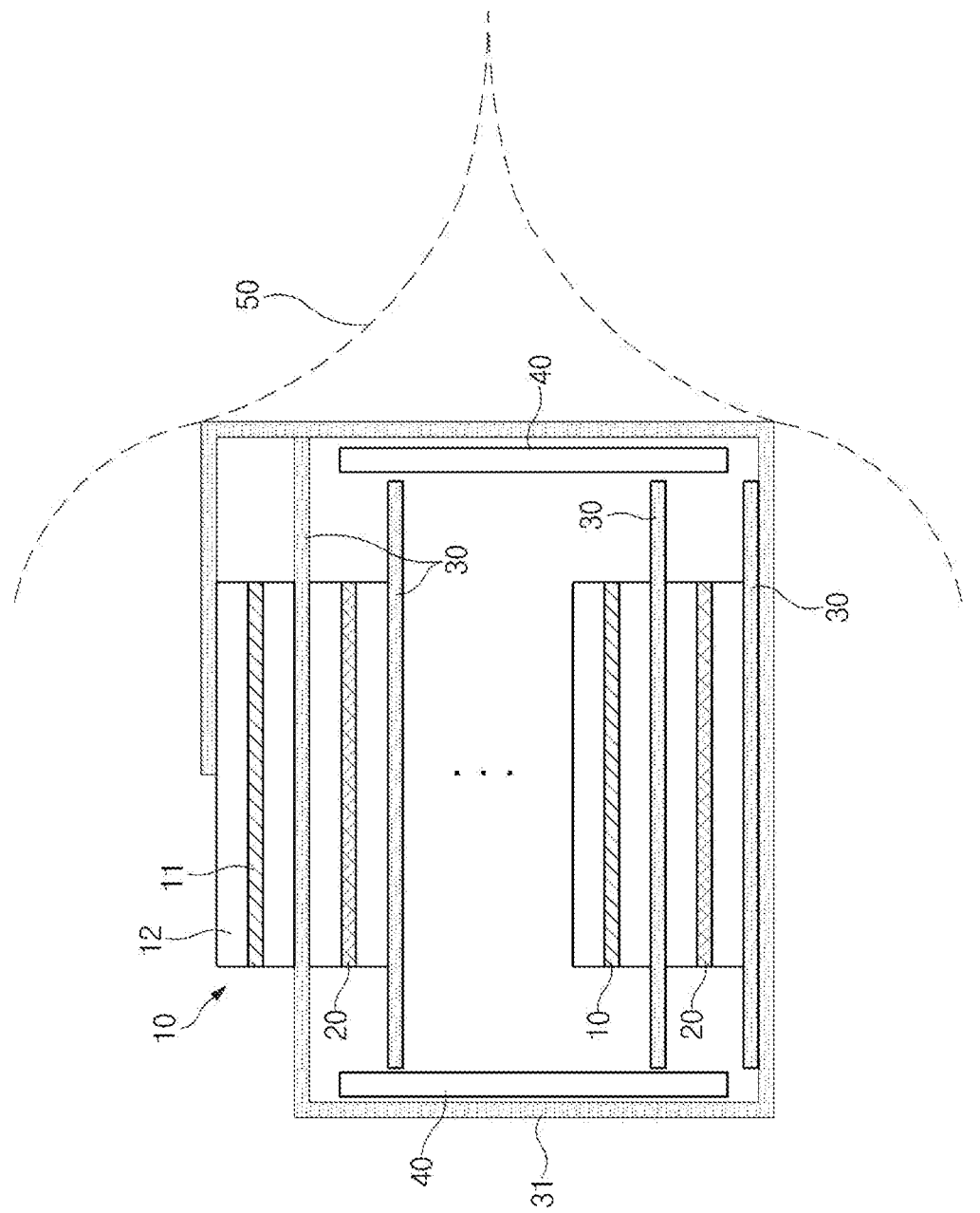
FIG. 4a is a side view illustrating a state in which a flat plate is inserted into each of both sides of the monocells in a space surrounded by the expansion part in the state of FIG. 3a according to Embodiment 5 of the present invention, i.e., a state in which an edge portion contacts a pouch within the pouch.

That is, in the electrode assembly according to Embodiment 5, the flat plate 40 is additionally mounted in an inner space surrounded by the expansion part 31. FIG. 4a is a side view illustrating a state in which the flat plate 40 is inserted into each of both sides of the monocells in the space surrounded by the expansion part 31 in the state of FIG. 3a according to Embodiment 5 of the present invention, i.e., a state in which an edge portion contacts the pouch 50 within the pouch 50. Referring to the drawing, since the flat plate 40 is fixed to be erected in a vertical direction in a negative electrode 20 and a positive electrode 10, the flat plate 40 may support pressing force in the vertical direction when the pouch 50 is gathered and may serve as a supporter when surrounded by the expansion part 31. Since the flat plate 40 has a flat plate shape, the flat plate 40 also has an effect of improving a degree of alignment of the electrode assembly.

In this embodiment, the plate 40 is made of a material that is not electrically conductive so as to prevent an occurrence of a short circuit. That is, the flat plate 40 may be provided as a kind of insulating plate. In some cases, aluminum within the pouch is exposed in a sealing part. If such the insulating plate is provided, an issue in which the exposed aluminum and the electrode assembly contact each other may be prevented.

Embodiment 6

In the present invention, an electrode assembly according to Embodiment 6 is the same as the electrode assembly according to Embodiment 5 in that the flat plate 40 is provided. However, the flat plate 40 is made of a metal material having thermal conductivity to provide the same function as a cooling plate that absorbs heat generated in the negative electrode 20 and the positive electrode 10 to reduce a temperature. Also, the flat plate 40 is disposed to be separated from the positive electrode 10 and the negative electrode 20 so as to prevent the short circuit by the flat plate 40.

Figure 4B:
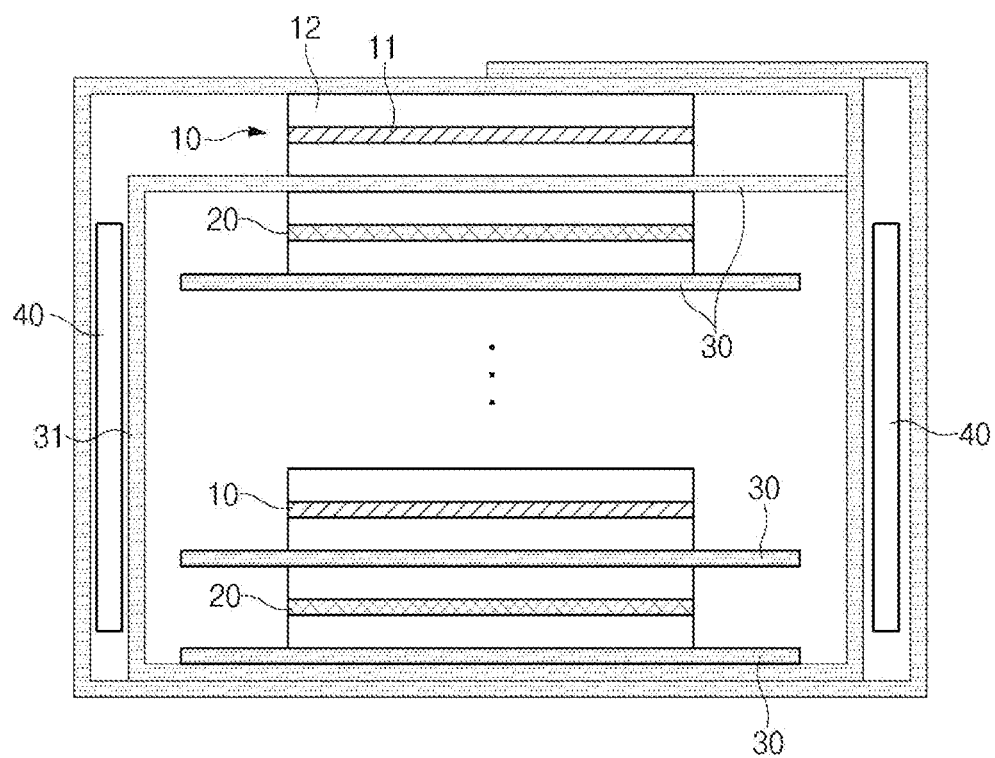
FIG. 4b is a side view illustrating a state in which the expansion part surrounds the entire monocells by two turns in the state of FIG. 3a according to Embodiment 6 of the present invention, i.e., a state in which the flat plate is inserted into each of both sides of the monocells between portions at which the expansion parts overlaps each other.

FIG. 4b is a side view illustrating a state in which the expansion part 31 surrounds the entire monocells by two turns in the state of FIG. 3a according to Embodiment 6 of the present invention, i.e., a state in which the flat plate 40 is inserted into each of both sides of the monocells between portions at which the expansion parts 31 overlaps each other. As illustrated in the drawing, the expansion part 31 has a doubly surrounding structure so that the flat plate 40 is disposed in a space separated from the positive electrode 10 and the negative electrode 20, and the flat plate is disposed formed by rotation of the expansion part 31.

In the structure according to this embodiment, the flat plate 40 may improve cooling performance for the negative electrode 20 and the positive electrode 30 without increasing in height of the electrode assembly.

As described above, when the flat plate 40 is vertically disposed, a positive electrode collector 11 and a negative electrode collector 21, each of which is made of a metal material, may conduct heat to the flat plate 40 (because the positive electrode collector 11 and the negative electrode collector 21 are closely disposed even though being separated by the separator). Thus, heat dissipation efficiency may be improved when compared to a structure in which the flat plate 40 is laminated in the same direction as the electrodes. That is, in the structure in which the flat plate 40 is laminated in the same direction as the electrodes, only the electrodes disposed at the upper and lower layers may absorb heat. However, in the structure in which the flat plate 40 is erected vertically, all the ends of the positive electrode collector 11 and the negative electrode collector 21 contact each other to improve the cooling performance.

[Fixing Through Collector]

Figure 5A:
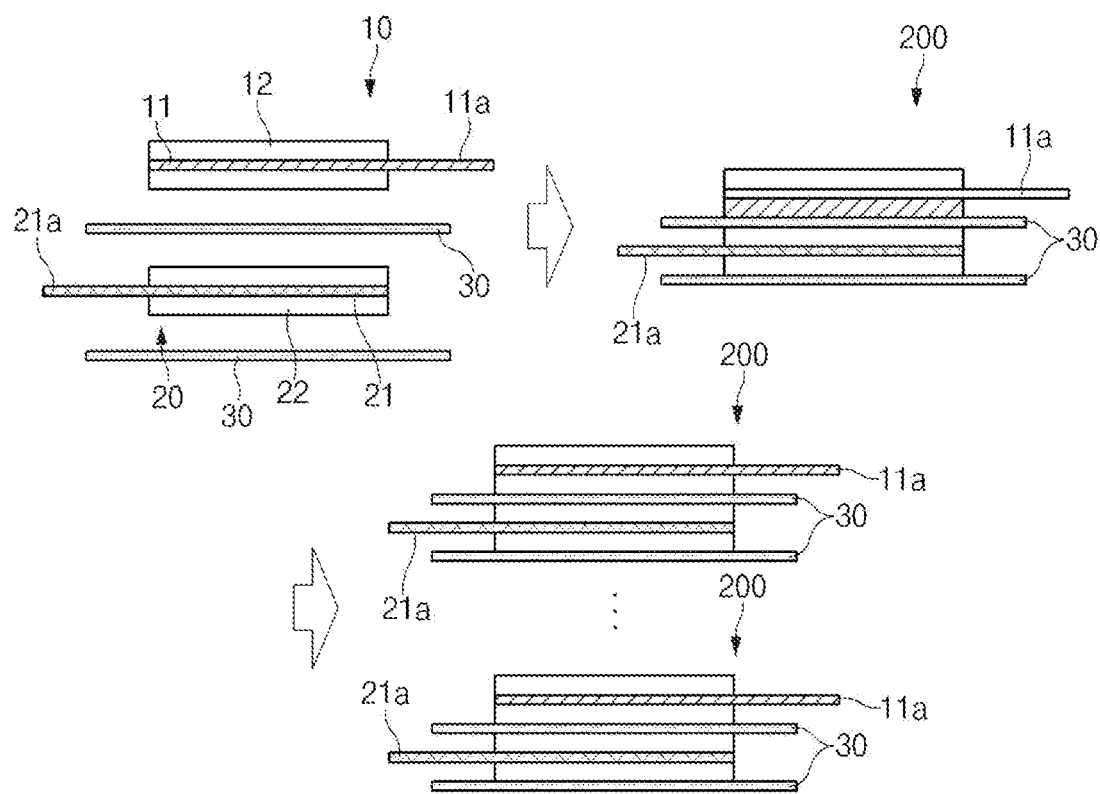
FIG. 5a is a side view illustrating a state in which the positive electrode on which a positive electrode extension part is formed on one side thereof, the separator, the negative electrode on which a negative electrode extension part is formed on the other side thereof, and the separator are laminated to constitute the monocell.

Also, the present invention provides a structure in which a positive electrode collector 11 and a negative electrode collector 21 extend instead of an expansion part 31 of a separator 30 so that extending portions 11a of the positive electrode collectors 11 are bonded and fixed to each other, and extending portions 21a of the negative electrode collectors 21 are bonded and fixed to each other. FIG. 5a is a view illustrating a state in which a positive electrode 10 on which a positive electrode extension part 11a is formed on one side thereof, a separator 30, a negative electrode 20 on which a negative electrode extension part 21a is formed on the other side thereof, and a separator 30 are laminated to constitute a monocell 200. That is, the electrode assembly having the above-described structure is characterized in that at least two or more monocells 200 comprising the positive electrode extension part 11a and the negative electrode extension part 21a are laminated. Here, the positive electrode extension parts 11a are bonded and fixed to each other, and the negative electrode extension parts 21a are bonded and fixed to each other.

Figure 6:
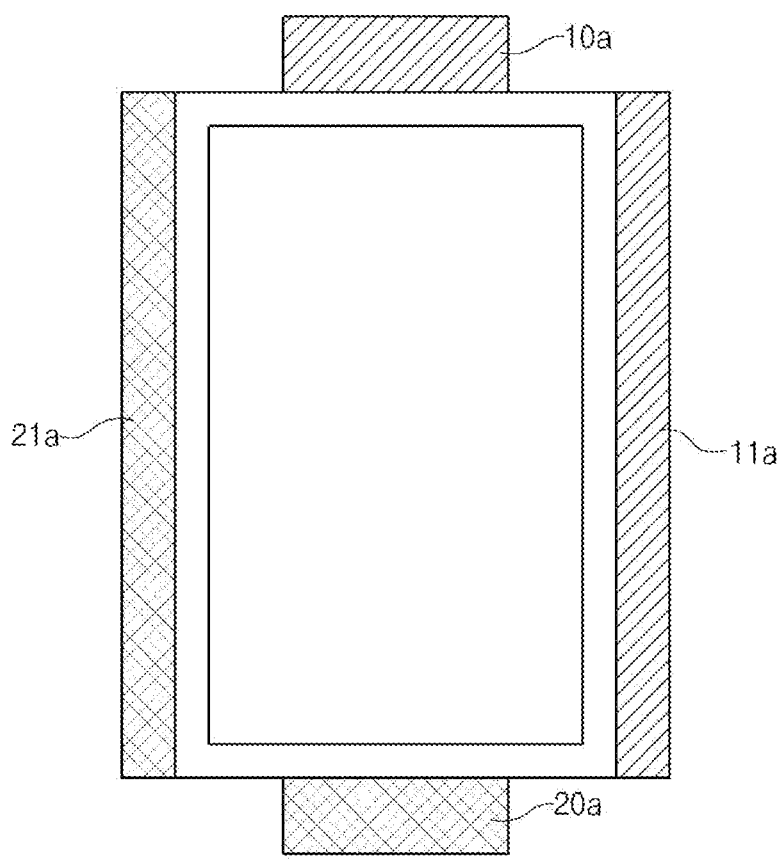
FIG. 6 is a plan view when the state of FIG. 5b is viewed downward from an upper side.
Figure 7:
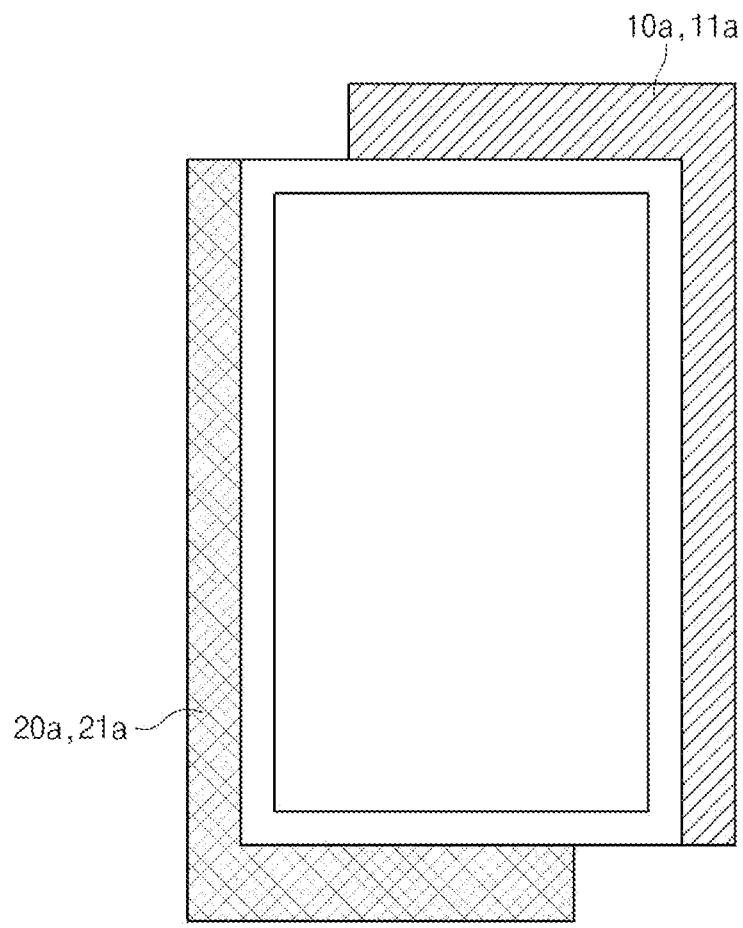
FIG. 7 is a plan view illustrating a state in which the positive electrode extension part and the negative electrode extension part are modified in shape.

Here, the positive electrode extension part 11a and the negative electrode extension part 21a may be formed separately from the positive electrode tab 10a and the negative electrode tab 20a as illustrated in FIG. 6, or may be integrally formed as illustrated in FIG. 7. Here, even though formed integrally, the positive electrode tab 10a and the negative electrode tab 20a may increase in area (i.e., the bonding area increases) to provide more stably fixing force.

Embodiment 7

Figure 5B:
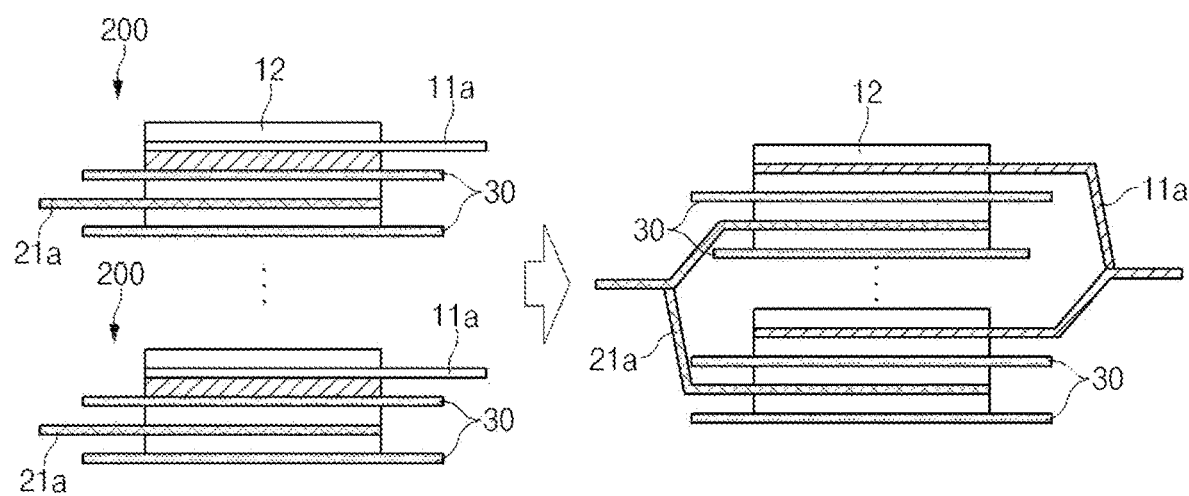
FIG. 5b is a side view illustrating a state in which the monocells of FIG. 5a are laminated, wherein the positive electrode extension parts are bonded and fixed to each other at one side, and the negative electrode extension parts are bonded and fixed to each other at the other side according to Embodiment 7 of the present invention.

FIG. 5b is a side view illustrating a state in which the monocells of FIG. 5a are laminated, wherein positive electrode extension parts 11a are bonded and fixed to each other at one side, and negative electrode extension parts 21a are bonded and fixed to each other at the other side according to Embodiment 7 of the present invention.

As illustrated in the drawing, the electrode assembly according to this embodiment is configured by laminating a plurality of monocells 200 in which a positive electrode 10, a separator 30, a negative electrode 20, and a separator 30 are sequentially laminated. Also, each of at least uppermost and lowermost monocells 200 of the monocells comprises a positive electrode extension part 11a in which a positive electrode collector 11 extends lengthily to one side and a negative electrode extension part 21a in which a negative electrode collector 21 extends lengthily to the other side. The positive electrode extension part 11a and the negative electrode extension part 21a are respectively bonded to the positive electrode extension part 11a and the negative electrode extension part 21a of the other monocell 200 to fix the laminated monocells. Here, as illustrated in FIG. 6, in this embodiment, the positive electrode extension part 11a and the negative electrode extension part 21a are formed separately from a positive electrode tab 10a extending from the positive electrode 10 and a negative electrode tab 20a extending from the negative electrode 20, respectively.

That is, in this embodiment, the monocell 200 has a rectangular shape. Also, the positive electrode tab 10a and the negative electrode tab 20a protrude in opposite directions, and the portions, at which the positive electrode extension parts 11a are bonded to each other, and the portions, at which the negative electrode extension parts 21a are bonded, protrude in opposite directions. Also, the positive electrode tab 10a and the negative electrode tab 20a protrude in directions perpendicular to each other.

In this embodiment, at least the uppermost and lowermost monocells may be monocells in which the positive electrode extension part 11a and the negative electrode extension part 21a are formed. That is, the positive electrode extension part 11a and the negative electrode extension part 21a are formed in all the laminated monocells 200. Also, all the positive electrode extension parts 11a may be bonded to each other, and all the negative electrode extension parts 21a may be bonded to each other.

The bonding between the positive electrode extension parts 11a and between the negative electrode extension parts 21a may be performed through welding. Alternatively, laser welding may be performed, but it is preferable that ultrasonic welding (typically, this is a welding method for welding the positive electrode tab and the negative electrode tab) is performed according to thicknesses of the positive electrode collector 11a and the negative electrode collector 21a.

Embodiment 8

As described above, in this embodiment, a separator 30 and a negative electrode 20 are additionally disposed at the uppermost layer so as to exclude an arrangement of a double-sided positive electrode at each of the outermost layers, for the purpose of minimizing precipitation of lithium (Li) contained in a positive electrode active material.

Figure 5C:
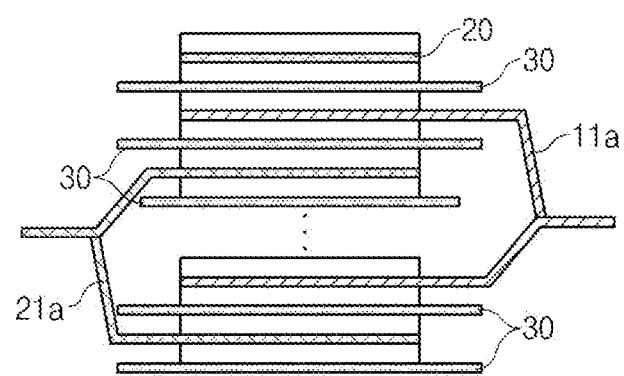
FIG. 5c is a side view illustrating a state in which the monocells of FIG. 5a are laminated, wherein the positive electrode extension parts are bonded and fixed to each other at one side, and the negative electrode extension parts are bonded and fixed to each other at the other side, and then, the separator and the negative electrode are additionally laminated at the uppermost layer according to Embodiment 8 of the present invention.

FIG. 5c is a side view illustrating a state in which the monocells of FIG. 5a are laminated, wherein positive electrode extension parts 11a are bonded and fixed to each other at one side, and negative electrode extension parts 21a are bonded and fixed to each other at the other side, and then, a separator 30 and a negative electrode 20 are additionally laminated at the uppermost layer. As illustrated in the drawing, the electrode assembly according to this embodiment has the same configuration as the electrode assembly according to Embodiment 7 except that one separator 30 and one negative electrode 20 are added at the uppermost layer. That is, in this embodiment, a positive electrode 10 is positioned at the uppermost layer of the monocell 200 laminated at the uppermost layer, and the separator 30 and the negative electrode 20 are sequentially stacked on the positive electrode 10 disposed at the uppermost layer.

For this, an auxiliary unit may be used. An auxiliary unit in which one negative electrode and one separator are bonded to each other may be provided, and then, the auxiliary unit may be further laminated at the uppermost layer of the laminated monocells 200.

Embodiment 9

Figure 5D:
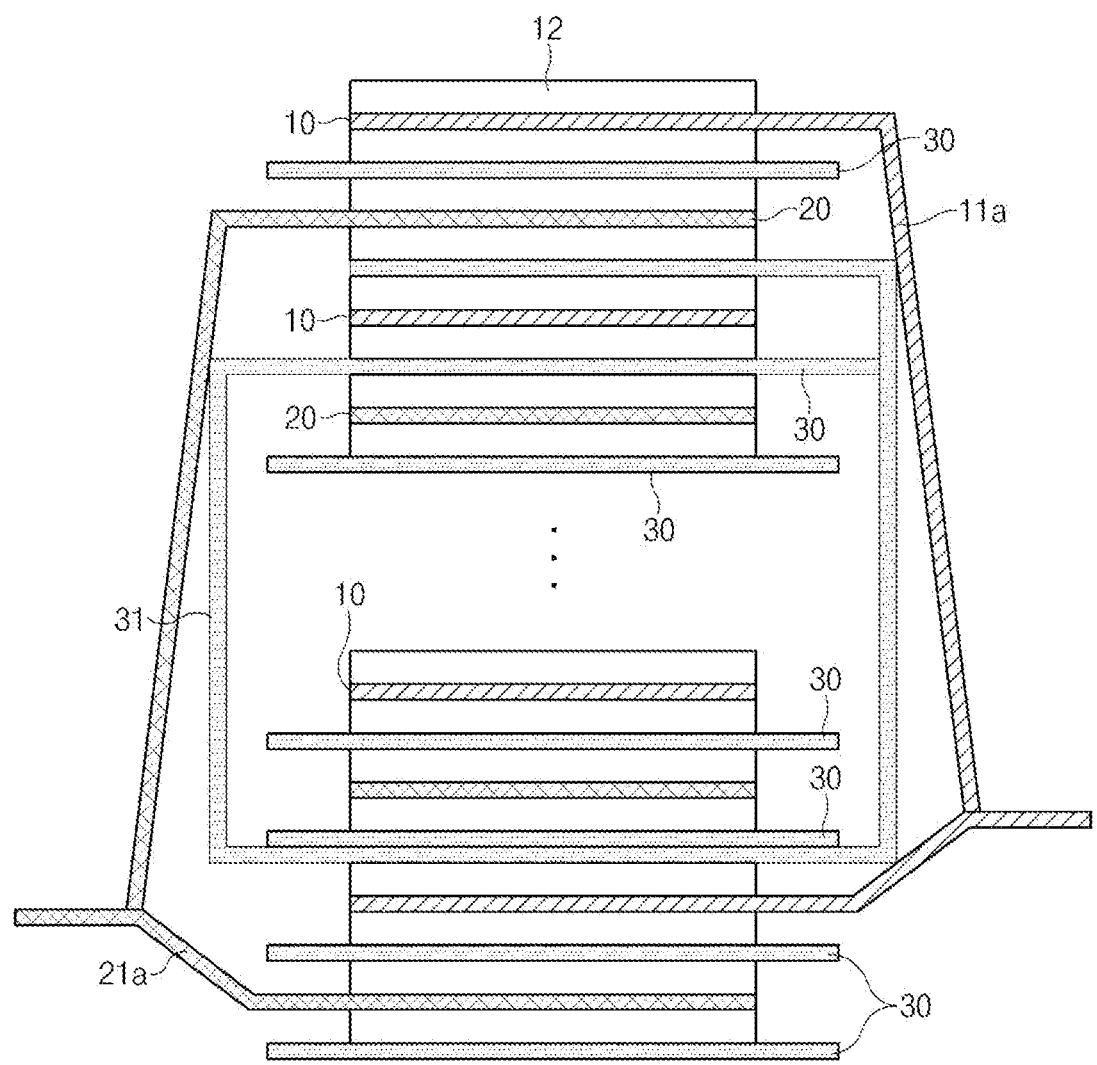
FIG. 5d is a side view illustrating a state in which the monocells of FIG. 5a are laminated at the uppermost layer and the lowermost layer, wherein, in the monocells laminated at the uppermost layer and the lowermost layer, the positive electrode extension parts are bonded and fixed to each other at one side, and the negative electrode extension parts are bonded and fixed to each other at the other side, and then, a sub electrode assembly having the same structure as the electrode assembly of FIG. 3a is inserted between the monocells disposed at the uppermost layer and the lowermost layer according to Embodiment 9 of the present invention.

Furthermore, the present invention provides a structure, in which a fixing method through an extension part of a collector and a fixing method through an expansion part of a separator are combined with each other, as Embodiment 9. FIG. 5d is a side view illustrating a state in which the monocells 200 of FIG. 5a are laminated at the uppermost layer and the lowermost layer, wherein, in the monocells 200 laminated at the uppermost layer and the lowermost layer, positive electrode extension parts 11a are bonded and fixed to each other at one side, and negative electrode extension parts 21a are bonded and fixed to each other at the other side, and then, a sub electrode assembly having the same structure as the electrode assembly of FIG. 3a is inserted between the monocells 200 disposed at the uppermost layer and the lowermost layer.

In this embodiment, the monocells in which the positive electrode extension part 11a and the negative electrode extension part 21a are formed are a monocell 200 laminated at the uppermost layer and a monocell 200 laminated at the lowermost layer. A sub electrode assembly in which the plurality of monocells are laminated is inserted between the uppermost monocell 200 and the lowermost monocell 200. Here, the sub electrode assembly have the same configuration as the electrode assembly according to Embodiment 1.

That is, in the sub electrode assembly, an expansion part 31 extending lengthily to one side is formed on the separator 30 laminated in the uppermost monocell, and the expansion part 31 of the separator 30 surrounds all the monocells of the sub electrode assembly so as to be disposed at the outermost layer in the sub electrode assembly. In this configuration, the positive electrode extension part 11a or the negative electrode extension part 21a may be prevented from contacting the individual electrode (the positive electrode or the negative electrode) inside the electrode assembly. When the positive electrode extension part 11a or the negative electrode extension part 21a contact the individual electrode inside the electrode assembly, a short-circuit accident may occur. Thus, the above-described configuration may prevent the short circuit from occurring.

In the electrode assemblies according to Embodiments 7 to 9, in which the fixing is performed by the extension parts formed on the collector, since the same kind of positive electrode extension parts 11a and negative electrode extension parts 21a are gathered to be bonded to each other, the positive electrode extension parts 11a and the negative electrode extension parts 21a may provide fixing force separated from that of the respective positive electrode tabs 10a and the respective negative electrode tabs 20a, which are gathered to be bonded to each other as described above.

Furthermore, in the foregoing embodiments, the positive electrode collector 11 and the negative electrode collector 21 are designed according to the thicknesses and characteristics of the active materials 12 and 22 to be applied and are manufactured to meet the required conditions of the electrode assembly. Thus, it is difficult to change the thicknesses. However, the positive electrode extension part 11a and the negative electrode extension part 21a to which the positive electrode active material 12 and the negative electrode active material 22 are not applied are relatively less in thickness constraint.

Thus, in the present invention, in the positive electrode collector 11 and the negative electrode collector 21, the positive electrode extension part 11a and the negative electrode extension part 21a may have thicknesses different from those of the portions coated with the active materials 12 and 22, respectively. That is, each of the positive electrode extension part 11a and the negative electrode extension part 21a may have a thin thickness at the bonded portion or be manufactured to be thinner than that of the portion coated with the active material so as to be vertically bent after being bonded. On the other hand, each of the positive electrode extension part 11a and the negative electrode extension part 21a may be manufactured to be thicker than that of the portion coated with the active material so as to more strongly support the movement of the monocells.

Figure 8:
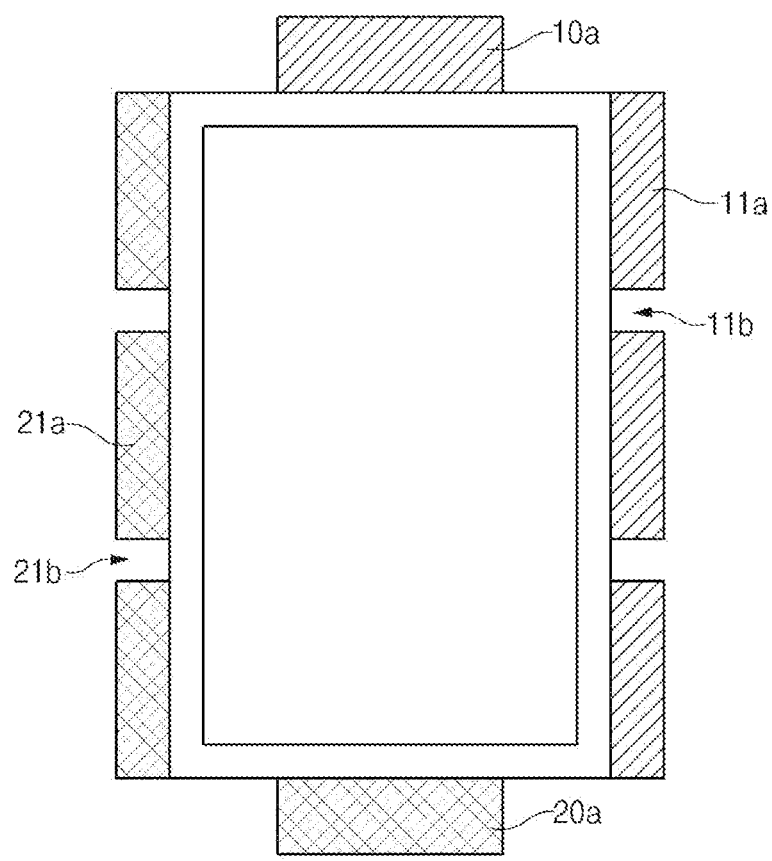
FIG. 8 is a plan view illustrating a state in which a pattern groove is formed in each of the positive electrode extension part and the negative electrode extension part.

FIG. 6 is a plan view when the state of FIG. 5b is viewed downward from an upper side, FIG. 7 is a plan view illustrating a state in which the positive electrode extension part and the negative electrode extension part are modified in shape, and FIG. 8 is a plan view illustrating a state in which a pattern groove is formed in each of the positive electrode extension part and the negative electrode extension part.

As illustrated in the drawings, the monocells 200 according to Embodiments 7 to 9 may also have a rectangular or square shape like the monocell 100 according to Embodiment 1.

Here, as illustrated in FIG. 6, a positive electrode tab 10*a* extending from a positive electrode 10 and a negative electrode tab 20*a* extending from a negative electrode 20 protrude in opposite directions, and portions, at which positive electrode extension parts 11*a* are bonded to each other, and portions, at which negative electrode extension parts 21*a* are bonded, protrude in opposite directions. Also, a positive electrode tab 10*a* and a negative electrode tab 20*a* protrude in directions perpendicular to each other. Like the positive electrode tab 10*a* and the negative electrode tab 20*a*, since the positive electrode extension part 11*a* and the negative electrode extension part 21*a* are portions extending from a positive electrode collector 11 and a negative electrode collector 21, respectively, the positive electrode extension part 11*a* and the negative electrode extension part 21*a* may also function as terminals through which current flows to the electrode assembly. That is, instead of the positive electrode tab 10*a* and the negative electrode tab 20*a*, points that are electrically connected to an external device may be the positive electrode extension part 11*a* and the negative electrode extension part 21*a*, respectively.

Furthermore, since the positive electrode tab 10*a* and the negative electrode tab 20*a* and the positive electrode extension part 11*a* and the negative electrode extension part 21*a* may provide the same function, the above-described constituents may be integrated into one body without separate classification. That is, as illustrated in FIG. 7, the positive electrode tab 10*a* extending from the positive electrode collector 11 and the positive electrode extension part 11*a* are integrally formed, and the negative electrode tab 20*a* extending from the negative electrode collector 21 is integrally formed with the negative electrode extension part 21*a* (on the contrary, any one of the positive electrode tab and the positive electrode extension part and only of the negative electrode tab and the negative electrode extension part may be omitted).

Here, in order to ensure the fixing force of each monocell 200 (to provide sufficient bonding force), in this embodiment, the positive electrode extension part 11*a* has a shape protruding from both sides of the monocell, and the negative electrode extension part 21*a* has a shape protruding from two sides that are opposite to the protruding two sides of the positive electrode extension part 11*a*.

Also, pattern grooves 11*b* and 21*b* which are recessed along the direction in which the positive electrode 10 and the negative electrode 20 are laminated (that is, in the thickness direction) are formed in the portion at which the positive electrode extension part 11*a* are bonded to each other and the portion at which the negative electrode extension portions 21*a* are bonded to each other. That is, as illustrated in FIG. 8, a plurality of pattern grooves 11*b* and 21*b* may be formed in the portion at which the positive electrode extension parts 11*a* are bonded to each other and the portion at which the negative electrode extension parts 21*a* are bonded to each other. The pattern grooves 11*b* and 21*b* may be utilized as spaces into which devices providing additional functions such as a coolant are inserted before the electrode assembly is embedded in the pouch. In this embodiment, the pattern groove 11*b* formed in the portion at which the positive electrode extension parts 11*a* are bonded to each other may be disposed at a position symmetrical to the pattern groove 21*b* formed in the portion at which the negative electrode extension parts 21*a* are bonded to each other.

The present invention having the technical features as described above is configured to fix the laminated monocells by surrounding the laminated monocells through the expansion part 31 of the separator 30 and fix the monocells by bonding the positive electrode extension parts 11*a* to each other and bonding the negative electrode extension parts 21*a* to each other. Thus, since the tape according to the related art is omitted, the internal resistance increase problem and the electrode degradation problem due to the thickness difference and the folding of the negative electrode may be solved.

The expansion part 31 may be bonded at a predetermined point by applying heat and pressure to form a smooth surface.

The expansion part 31 of the separator may have a thickness and/or composition different from that of other portions to improve adhesion and impregnation of an electrolyte. Also, each of the positive electrode extension part 11*a* and the negative electrode extension part 21*a* may have a thickness different from that of each of other portions (portions coated with the active material), and thus, the welding performance and the size of the welded portion may variously vary as necessary.

The monocell has high stability because the positive electrode and the separator are bonded to each other, and the separator and the negative electrode are bonded to each other.

Also, the flat plate 40 may be selectively inserted into the region surrounded by the extension part 31 to improve the cooling efficiency and the supporting force. Furthermore, since the coolant is selectively inserted into the portions in which the pattern grooves 11*b* and 21*b* are formed, the cooling efficiency may be improved.

Furthermore, as the electrode assembly having the above technical features is provided, the present invention may additionally provide a secondary battery in which the electrode assembly according to the present invention is embedded in the pouch and a secondary battery module in which a plurality of secondary batteries are electrically connected to each other.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly, comprising:
    two or more monocells laminated to each other, each monocell having a positive electrode, a first separator, a negative electrode, and a second separator that are sequentially laminated,
    wherein each of the two or more monocells comprises a positive electrode extension part formed from a positive electrode collector of the positive electrode and extending laterally to one side of the monocell, and a negative electrode extension part formed from a negative electrode collector of the negative electrode and extending laterally to another side of the monocell, and the positive electrode extension parts are bonded to one another and the negative electrode extension parts are bonded to one another, the positive and negative electrode extension parts fixing the monocells to one another, wherein the positive electrode extension part and the negative electrode extension part of each monocell are formed separately from a positive electrode tab extending from the positive electrode and a negative electrode tab extending from the negative electrode in first and second opposite directions, respectively, wherein the positive electrode extension part and the negative electrode extension part of each monocell protrude from the monocells in third and fourth opposite directions perpendicular to the first and second opposite directions, and wherein each of the first, second, third, and fourth directions are parallel to respective planes in which the positive and negative electrodes extend.

2. The electrode assembly of claim 1, wherein each of the monocells has a rectangular shape.

3. The electrode assembly of claim 1, wherein the positive electrode of an uppermost one of the monocells is disposed at an uppermost layer of the two or more monocells, and another separator and another negative electrode are sequentially laminated on the positive electrode of the uppermost one of the monocells.

4. An electrode assembly, comprising:

two or more monocells laminated to each other, each monocell having a positive electrode, a first separator, a negative electrode, and a second separator that are sequentially laminated; and a sub electrode assembly in which a plurality of additional monocells are laminated and inserted between an uppermost and a lowermost one of the two or more monocells, wherein each of the two or more monocells comprises a positive electrode extension part formed from a positive electrode collector of the positive electrode and extending laterally to one side of the monocell, and a negative electrode extension part formed from a negative electrode collector of the negative electrode and extending laterally to another side of the monocell, and the positive electrode extension parts are bonded to one another and the negative electrode extension parts are bonded to one another, the positive and negative electrode extension parts fixing the monocells to one another, wherein, in one of the additional monocells, an expansion part extending laterally to one side of the one of the additional monocells is formed from a separator of the one of the additional monocells, and the expansion part wraps around the additional monocells of the sub electrode assembly so as to be disposed at uppermost and lowermost layers of the sub electrode assembly.

5. The electrode assembly of claim 1, wherein the positive electrode extension part of each monocell has a first thickness different from a second thickness of a portion of the positive electrode collector coated with the positive electrode active material, and the negative electrode extension part of each monocell has a third thickness different from a fourth thickness of a portion of the positive electrode collector coated with the negative electrode active material.

6. The electrode assembly of claim 1, wherein each of the monocells has a rectangular shape, a positive electrode tab extending from the positive electrode collector of each monocell is integrated with the positive electrode extension part, and a negative electrode tab extending from the negative electrode collector of each monocell is integrated with the negative electrode extension part, wherein the positive electrode extension part of each monocell has a shape protruding from first and second adjacent sides of the monocell, and the negative extension part of each monocell has a shape protruding from third and fourth sides of the monocell that are opposite to the first and second sides, respectively.

7. An electrode assembly, comprising:

two or more monocells laminated to each other, each monocell having a positive electrode, a first separator, a negative electrode, and a second separator that are sequentially laminated, wherein each of the two or more monocells comprises a positive electrode extension part formed from a positive electrode collector of the positive electrode and extending laterally to one side of the monocell, and a negative electrode extension part formed from a negative electrode collector of the negative electrode and extending laterally to another side of the monocell, and the positive electrode extension parts are bonded to one another and the negative electrode extension parts are bonded to one another, the positive and negative electrode extension parts fixing the monocells to one another, and wherein pattern grooves are formed in the positive electrode extension parts and in the negative electrode extension parts at first locations at which the positive electrode extension parts are bonded to each other and at second locations at which the negative electrode extension parts are bonded to each other, respectively.

8. The electrode assembly of claim 7, wherein the first locations of the pattern grooves formed in the positive electrode extension parts are symmetrical with respect to the second locations of the pattern grooves formed in the negative electrode extension parts.

9. The electrode assembly of claim 7, wherein, in each monocell, the positive electrode and the first separator are bonded to each other, and the second separator and the negative electrode are bonded to each other.

10. A secondary battery module mounted so that a plurality of secondary batteries are electrically connected to each other, each of the secondary batteries being the secondary battery of claim 7.

* * * * *